United States Patent Office 3,380,663
Patented Apr. 30, 1968

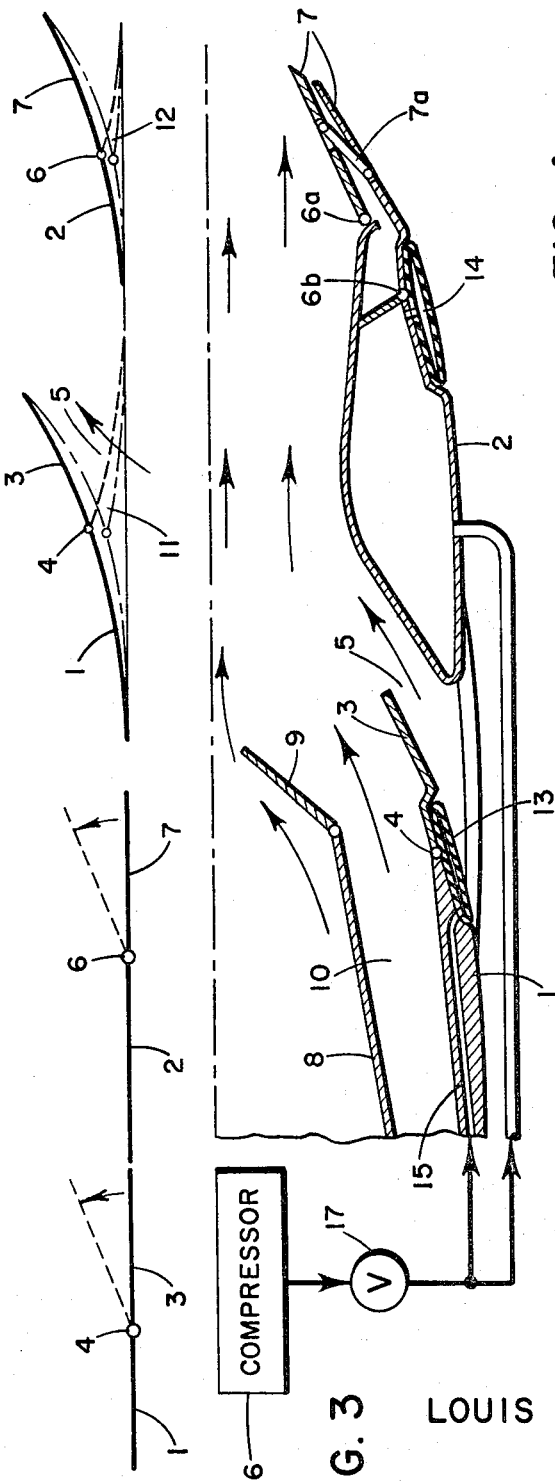

3,380,663
INFLATABLE APPARATUS FOR MAINTAINING CONTINUITY OF A VARIABLE CONTOUR OF AN ADJUSTABLE JET PIPE
Louis Francois Jumelle, Paris, France, assignor to Société Nationale d'Etude et de Construction de Moteurs d'Aviation, Paris, France, a company of France
Filed Dec. 13, 1965, Ser. No. 513,364
Claims priority, application France, Dec. 14, 1964, 998,537
3 Claims. (Cl. 239—265.43)

ABSTRACT OF THE DISCLOSURE

Controllable means for maintaining the continuity of a variable external contour of a jet pipe equipped with shutters, flaps or like movable members effecting adjustment thereof and connected to stationary casing portions at the downstream end thereof, such means including inflatable bodies secured to the outside surface of the jet pipe and straddling the connections between said movable members and said stationary portions.

---

This invention relates to apparatus for maintaining continuity of a variable external outline or contour of an adjustable jet pipe.

Aircraft structures, in order to improve their external aerodynamic qualities, are frequently required to alter configuration according to flight conditions. When the surfaces concerned cannot be altered in shape to suit differing conditions of use, the designer is obliged to effect a compromise between the various configurations which, it is envisaged, will respectively suit the differing conditions of use.

It has already been proposed to have recourse to inflatable flexible elements or bags to ensure improved flow in all circumstances of flight. Thus, French Patents Nos. 997,817 of July 31, 1945, and 1,231,392 of July 25, 1959, advocate the application in aeronautics of inflatable bodies respectively to devices providing very high lift and to orifices for air intake.

The present invention relates to apparatus including inflatable bodies, to be applied to the variable external contour of a jet engine tail pipe with movable shutters or flaps that are designed so as to be able to assume different configurations at subsonic and at supersonic speeds.

In this instance, practice shows that a compromise has to be effected between the supersonic and the subsonic configuration, by reason of the fact that the latter configuration is subject to considerable losses in respect of external flow due to abrupt angular changes in contour. This leads to the provision, upstream of shutters or flaps, of a curved lead-in which provides for suitable flow lines in subsonic operation. But, by reason of this provision, there are angular changes in contour, in the opposite case, i.e. when operation is taking place supersonically, and a compromise has to be made at the expense of both configurations (this compromise being made necessary by the requirement not to "block" the flow of tertiary air by reason of too great a change in angle of flow in subsonic operation, whilst not to have too abrupt a deflection in outline also in subsonic operation leads inevitably to losses through shock effect on angular variations in contour while in the supersonic configuration).

The present invention enables these difficulties to be remedied by means of the installation of inflatable bodies on the outside periphery and upstream of the major portion of movable shutters or flaps providing for the intake of outside air into the jet pipe or shutters or flaps at the jet pipe nozzle. In this manner, with external continuity already fully ensured when the movable shutters are in the closed position, inflation of the bodies permits the break in outline caused by the shutters opening to be filled, thus re-establishing an acceptable external flow in spite of the change in configuration.

It is clear that it might have been proposed to have recourse to mechanical arrangements, for example movable plates acting as covers, so as to obtain the desired result of a continuous contour in both configurations, but such a solution would be extremely complex and delicate, whereas inflatable bodies afford equivalent advantages with less complication and superior reliability.

Naturally the flexible material employed for making the inflatable bodies must be able to withstand the temperature of the aircraft's external skin at high speeds.

In the drawings:

FIGURES 1 and 2 show in a highly diagrammatic manner, in longitudinal half-sections relating to the lower parts, a jet pipe with a configuration adapted to supersonic flight in FIGURE 1 and another one adapted to subsonic flight in FIGURE 2.

FIGURES 3 and 4 are analogous sections in rather more detail applying to subsonic and to supersonic configurations respectively and showing the application of inflatable bodies in conformity with the present invention.

To explain this invention, reference is herewith made to a jet pipe for a supersonic aircraft that of necessity must adapt itself to lower speeds, at which the aircraft is called upon to fly for considerable durations of time, apart from those times when operating at its supersonic cruising speed. Said jet pipe is of an already known type, with a variable nozzle area and with an additional intake for outside air.

In the drawings there is shown a jet pipe of this type, having a fixed upstream fairing 1 and a downstream fairing 2, likewise fixed, interconnected by shutters or flaps 3 hinged at 4 on the upstream fairing 1 and opening inwardly so as to uncover a lateral passage 5 for the entry of outside air. On the terminal portion of the fixed downstream fairing 2 there are likewise hinged at 6, shutters 7 for adjusting the jet pipe nozzle section. The outside air admitted at 5 constitutes a tertiary inward flow, the primary flow of hot gases moving along an internal duct 8 that terminates in an adjustable pipe 9 and the secondary flow of air taken in flowing within an annular channel 10 that is bounded by the fixed upstream fairing 1 and by the internal duct 8.

If reference be now made to FIGURE 1, which shows the configuration in supersonic flight, it will be seen that the fixed fairings 1, 2 and the shutters 3, 7 prolonging them present a quasi-cylindrical surface ideal for this condition. However, in subsonic flight, after the shutters 3 and 7 have pivoted inwardly (position shown in dashes), abrupt breaks or deflections in contour occur at the hinges 4 and 6, a phenomenon unfavourable to the external flow.

On the other hand, FIGURE 2 shows (in unbroken lines) the ideal contour for the jet pipe in subsonic flight, the various elements following two curves that are regularly convex. But if the desired supersonic configuration (in dashes) is adopted, the external flow is spoiled by the breaks in outline at 11 and 12 of the shutters 3 in their closed position and of the shutters 7 in their open position.

The compromise solution consists in adopting a contour that is intermediate between the two FIGURES 1 and 2, this contour being shown in dash-dot lines in FIGURE 2. This compromise solution diverges from the ideal but incompatible contours shown in unbroken lines in FIGURES 1 and 2, but gives rise to inconvenient features that are less disadvantageous than those arising by adoption of either one of the original configurations, although on the other hand applying to all conditions of flight.

The present invention aims at remedying this disadvantage and at approximating as closely as possible to the ideal contours, both in the subsonic and in the supersonic configurations.

This essentially consists in arranging, on the outside of the jet pipe, inflatable bodies 13 and 14 (see FIGURES 3 and 4) that are fixed, on either side of the hinges 4 and 6 respectively, to the downstream portion of the external skin of the fixed fairings 1 and 2 and to the upstream portion of the outer surface of the shutters 3 and 7.

Thus while using the same jet pipe, an external flow that is as perfect as possible is ensured in the two different conditions of operation. In supersonic flow (FIGURE 4) the shutters 3 for tertiary air are closed and the shutters 7 are at maximum aperture. In subsonic flow (FIGURE 3) the greatly reduced expansion ratio of gases in the primary jet pipe 8 effects the opening of the lateral passage 5 by way of the shutters 3, so allowing tertiary air to pass; at the same time, the terminal section of the secondary duct is reduced through closure of the shutters 7.

At subsonic speed the bodies 13 and 14 (see FIGURE 3), under the effects of their flexibility on the one hand and of their being connected, when so required, with an arrangement for lowering pressure or for adjusting to outside pressure on the other hand, become flattened against the surface of the fairing and of the respective shutters, each within a recess provided for such body.

At supersonic speed (see FIGURE 4) the closing of the shutters 3 brings about a break in the curve of the external contour, but the inflation of the bodies 13 suppresses this loss-generating break and re-establishes continuity between the fairings 1 and 2.

The air for inflation is supplied by a compressor 16 by way of pipes 15 equipped with valves 17 controlled by the pilot or by automatic means.

The same applies in the case of bodies 14 mounted on the fairing 2 and the shutters 7. The fairing 2 may be hollow and may serve as a pressurized enclosure fed by a compressor, so that the bodies 14 may be inflated.

The inflatable bodies 13 and 14 require to be made of a material that withstands the "athermanous" temperature of the external skin at the supersonic speed in question, increased by a deviating figure that is due to radiation from the hot jet stream. Such flexible materials, withstanding temperatures of 200° C. or more, are at present available on the market.

An examination of FIGURES 3 and 4 will certainly show the advantage in the solution proposed by the present invention. External contours, in the vicinity of shutters 3 and 7, are entirely continuous, without any abrupt variation in curvature either in the subsonic or supersonic configuration, whereas any purely mechanical solution would, if the design were not complicated to an extraordinary degree, most certainly result in local angular breaks, in one configuration or another.

The present invention is likewise also applicable to jet pipes of the type already described but comprising thick monobloc terminal shutters in place of the shutters shown in FIGURES 3 and 4 and constituted by plates 7 set apart, connected by means of a small interconnecting rod 7a and hinging on two different parallel axes 6a and 6b.

What I claim is:

1. A variable external contour, jet engine pipe comprising a rigid stationary casing portion having a downstream end, at least one rigid movable member forming a downstream extension of said stationary casing portion and having an upstream end hingedly connected to said downstream end, said ends being mutually shaped to form an outwardly facing recess extending across the hinged connection between said stationary portion and said movable member, at least one inflatable body secured within said recess and straddling said hinged connection, said stationary portion, said inflatable body and said movable member having exposed outer surfaces in successive, juxtaposed relationship, which define in part the external contour of said pipe, and means for selectively inflating and deflating said body thereby to ensure continuity of said external contour irrespective of the position of said movable member.

2. Jet engine pipe as claimed in claim 1, wherein said movable member is adjustable to an inwardly set position and to an outwardly set position, and said inflatable body is deflated when said member is in the former-mentioned position and inflated when said member is in the latter-mentioned position, whereby said recess is substantially filled by said inflatable body in both said positions.

3. Jet engine pipe as claimed in claim 1, comprising two stationary casing portions axially spaced from each other to define therebetween a gap and each having a downstream end, a movable shutter system controlling said gap and having an upstream end hingedly connected to the downstream end of the upstream casing portion and forming therewith a recess, a movable flap system forming a variable area nozzle and having an upstream end hingedly connected to the downstream end of the downstream casing portion and forming therewith a recess, and two inflatable bodies housed respectively in said recesses.

References Cited
UNITED STATES PATENTS

| 2,960,281 | 11/1960 | Jumelle et al. | 244—53 X |
| 3,057,150 | 10/1962 | Horgan | 239—265.41 X |
| 3,062,003 | 11/1962 | Hamilton | 239—265.41 X |
| 3,130,941 | 4/1964 | Pazmany | 244—53 X |

M. HENSON WOOD, JR., *Primary Examiner.*

V. C. WILKS, *Assistant Examiner.*